United States Patent
Yong et al.

(10) Patent No.: US 8,024,594 B2
(45) Date of Patent: Sep. 20, 2011

(54) METHOD AND APPARATUS FOR REDUCING POWER CONSUMPTION IN MULTI-CHANNEL MEMORY CONTROLLER SYSTEMS

(75) Inventors: Yean Kee Yong, Singapore (SG); Durgesh Srivastava, Santa Clara, CA (US); Niall D. McDonnell, Limerick (IE); Rakesh Dodeja, Portland, OR (US); Neelam Chandwani, Portland, OR (US)

(73) Assignee: Intel Corporation, Santa Clara, CA (US)

( * ) Notice: Subject to any disclaimer, the term of this patent is extended or adjusted under 35 U.S.C. 154(b) by 699 days.

(21) Appl. No.: 12/059,617

(22) Filed: Mar. 31, 2008

(65) Prior Publication Data
US 2009/0249102 A1  Oct. 1, 2009

(51) Int. Cl.
*G06F 1/04* (2006.01)
(52) U.S. Cl. ........ 713/324; 713/300; 713/310; 713/320; 713/321; 713/323; 713/330; 713/340
(58) Field of Classification Search .................. 713/300, 713/310, 320–324, 330, 340
See application file for complete search history.

(56) References Cited

U.S. PATENT DOCUMENTS

| | | | |
|---|---|---|---|
| 2003/0061383 A1 | 3/2003 | Zilka | |
| 2003/0204758 A1 | 10/2003 | Singh | |
| 2004/0019815 A1 | 1/2004 | Vyssotski | |
| 2007/0283178 A1 | 12/2007 | Dodeja | |
| 2007/0298848 A1* | 12/2007 | Babin | 455/574 |
| 2008/0043562 A1* | 2/2008 | Totolos et al. | 365/227 |
| 2008/0294928 A1* | 11/2008 | Jain et al. | 713/600 |
| 2010/0157867 A1* | 6/2010 | Babin | 370/311 |

FOREIGN PATENT DOCUMENTS

JP  05-126872 A  5/1993

* cited by examiner

*Primary Examiner* — Abdelmoniem Elamin
(74) *Attorney, Agent, or Firm* — Grossman, Tucker, Perreault & Pfleger, PLLC

(57) ABSTRACT

Disclosed is a method, apparatus and computer program product for reducing memory power consumption in a server system. The server system includes a memory controller and a plurality of Dual Inline Memory Modules (DIMMs). The method for reducing the memory power consumption includes determining a status of a channel of a plurality of channels of the memory controller. The plurality of channels is associated with the plurality of DIMMs of the server system. The status of the channel represents a presence of at least one scheduled transaction in the channel. The method further includes monitoring the status of the channel by checking whether the status of the channel is in an idle mode for a period of at least equal to a first threshold time. Thereafter, the method includes driving the channel into a power down state based on the monitoring of the status of the channel.

7 Claims, 4 Drawing Sheets

METHOD AND APPARATUS FOR REDUCING POWER CONSUMPTION IN MULTI-CHANNEL MEMORY CONTROLLER SYSTEMS

FIELD OF THE DISCLOSURE

The present disclosure relates to a method and apparatus for reducing power consumption in a multi-channel memory controller system.

BRIEF DESCRIPTION OF THE DRAWINGS

The advantages and features of the present disclosure will become better understood with reference to the following detailed description and claims taken in conjunction with the accompanying drawings, wherein like elements are identified with like symbols, and in which:

Like reference numerals refer to like parts throughout the description of several views of the drawings.

DETAILED DESCRIPTION OF THE DISCLOSURE

For a thorough understanding of the present disclosure, reference is to be made to the following detailed description, including the appended claims, in connection with the above-described drawings. Although the present disclosure is described in connection with exemplary embodiments, the present disclosure is not intended to be limited to the specific forms set forth herein. It is understood that various omissions and substitutions of equivalents are contemplated as circumstances may suggest or render expedient, but these are intended to cover the application or implementation without departing from the spirit or scope of the claims of the present disclosure. Also, it is to be understood that the phraseology and terminology used herein is for the purpose of description and should not be regarded as limiting.

The terms "first," "second," and the like, herein do not denote any order, quantity, or importance, but rather are used to distinguish one element from another, and the terms "a" and "an" herein do not denote a limitation of quantity, but rather denote the presence of at least one of the referenced item.

Figure 1:
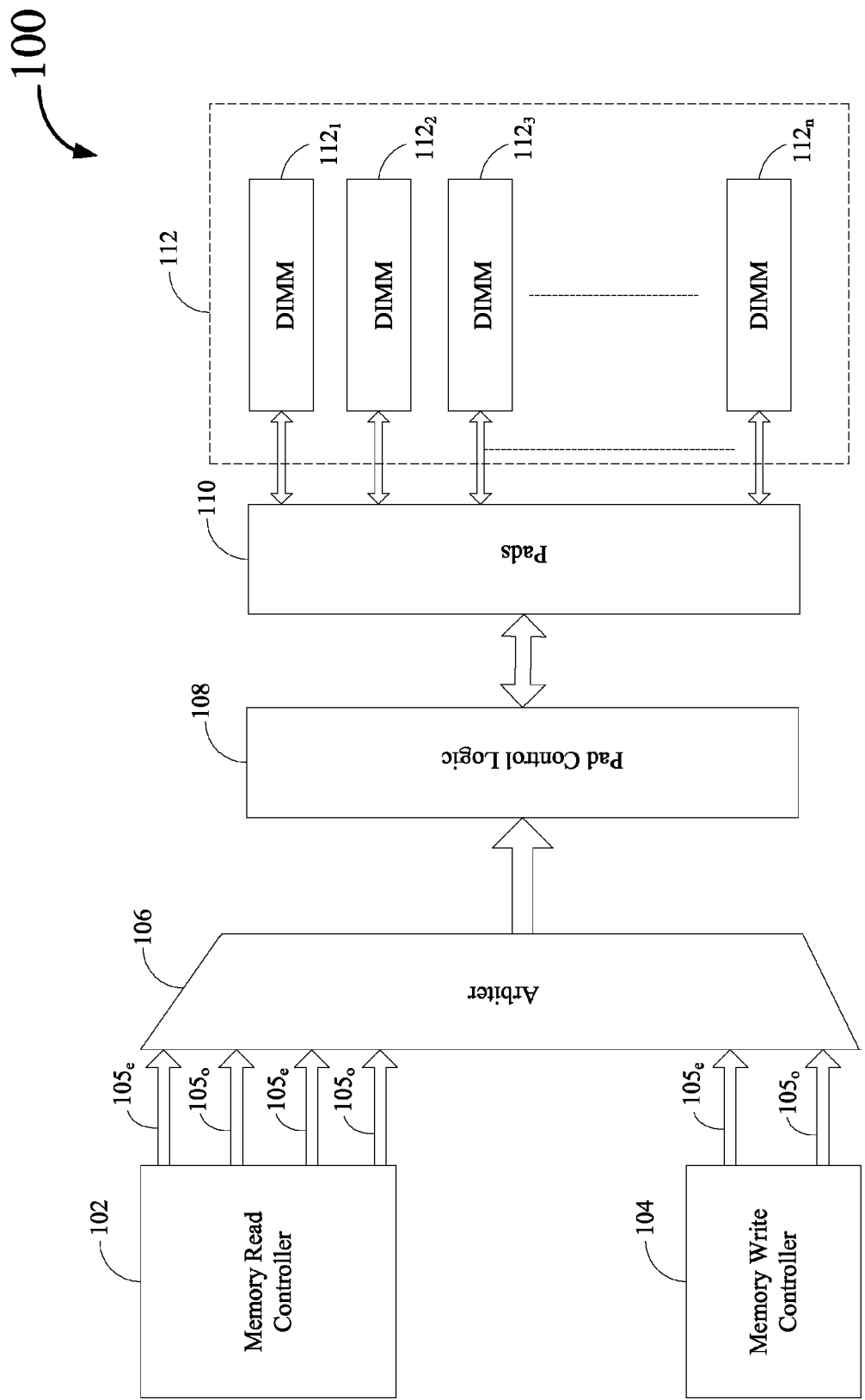
FIG. 1 is a schematic diagram depicting an exemplary server system in which various embodiments of the present disclosure may be practiced.

FIG. 1 depicts a server system 100 in which various embodiments of the present disclosure may be practiced. The server system 100 may be a platform based server, for example, a blade server, a rackmount server, a pedestal server, and the like. The server system 100 of this embodiment includes a memory controller including a memory read controller 102 and a memory write controller 104, an arbiter 106, a pad control logic 108, pads 110 and a plurality of Dual Inline Memory Modules (DIMMs) 112 ($112_1$-$112_n$, 'n' being an integer number and greater than 1). The server system 100, as shown in FIG. 1, is for the exemplary purposes only, and includes only components that are presented herein for the purpose of this description. Further, the server system 100 may include fewer or more number of similar components, which are shown in FIG. 1.

The memory read controller 102 and the memory write controller 104 may be configured to control reading from and writing into the DIMMs 112. In this embodiment, there are separate queues for read and write transactions in the memory read controller 102 and the memory write controller 104, respectively. Within the memory read controller 102, these queues may be separated between even ranks and odd ranks. As shown in FIG. 1, exemplary even ranks ($105_e$) and exemplary odd ranks ($105_o$) are shown in each of the memory read controller 102 and the memory write controller 104. Of course, the memory read controller 102 and the memory write controller 104 may also be a single entity (for example, a single integrated circuit).

Herein, the description of the present disclosure will be described in order to reduce memory power consumption between the memory read controller 102 and the DIMMs 112. Accordingly, the description of the present disclosure presents a method, system and computer program product to reduce the memory power consumption between the memory read controller 102 and the DIMMs 112. The teachings presented herein may also be used to reduce the memory power consumption between the memory write controller 104 and the DIMMs 112. Further, a similar method, system and computer program product may also be used to reduce the memory power consumption between a memory controller having a memory read controller and a memory write controller as a single entity, and the DIMMs 112.

The memory read controller 102 has a plurality of channels (not shown) associated with the DIMMs 112. A typical channel may include at least one even rank such as an even rank $105_e$ and at least one odd rank such as an odd rank $105_o$. Specifically, the memory read controller 102 performs transactions, such as read transactions through the plurality of channels. A single channel may be associated with more than one DIMM of the DIMMs 112. The memory read controller 102 may be coupled to the DIMMs 112 through an arbiter 106 and pad control logic 108. More specifically, the memory read controller 102 may be connected to the pad 110, which provides a connection to the DIMMs 112 to the memory read controller 102. The arbiter 106 may be configured to control an order of the various read transactions that may be performed by the memory read controller 102 on the DIMMs 112. Examples of the DIMMs 112 may include, but are not limited to, multiple pins DIMMs such as small outline DIMM (SO-DIMM), Micro DIMM and Fully Buffered DIMM (FB-DIMM). These DIMMs may be used for purposes of Synchronous Dynamic Random Access Memory (SDRAM), Double Data Rate SDRAM (DDR SDRAM), DDR2 SDRAM, DDR3 SDRAM, and the like.

Figure 2:
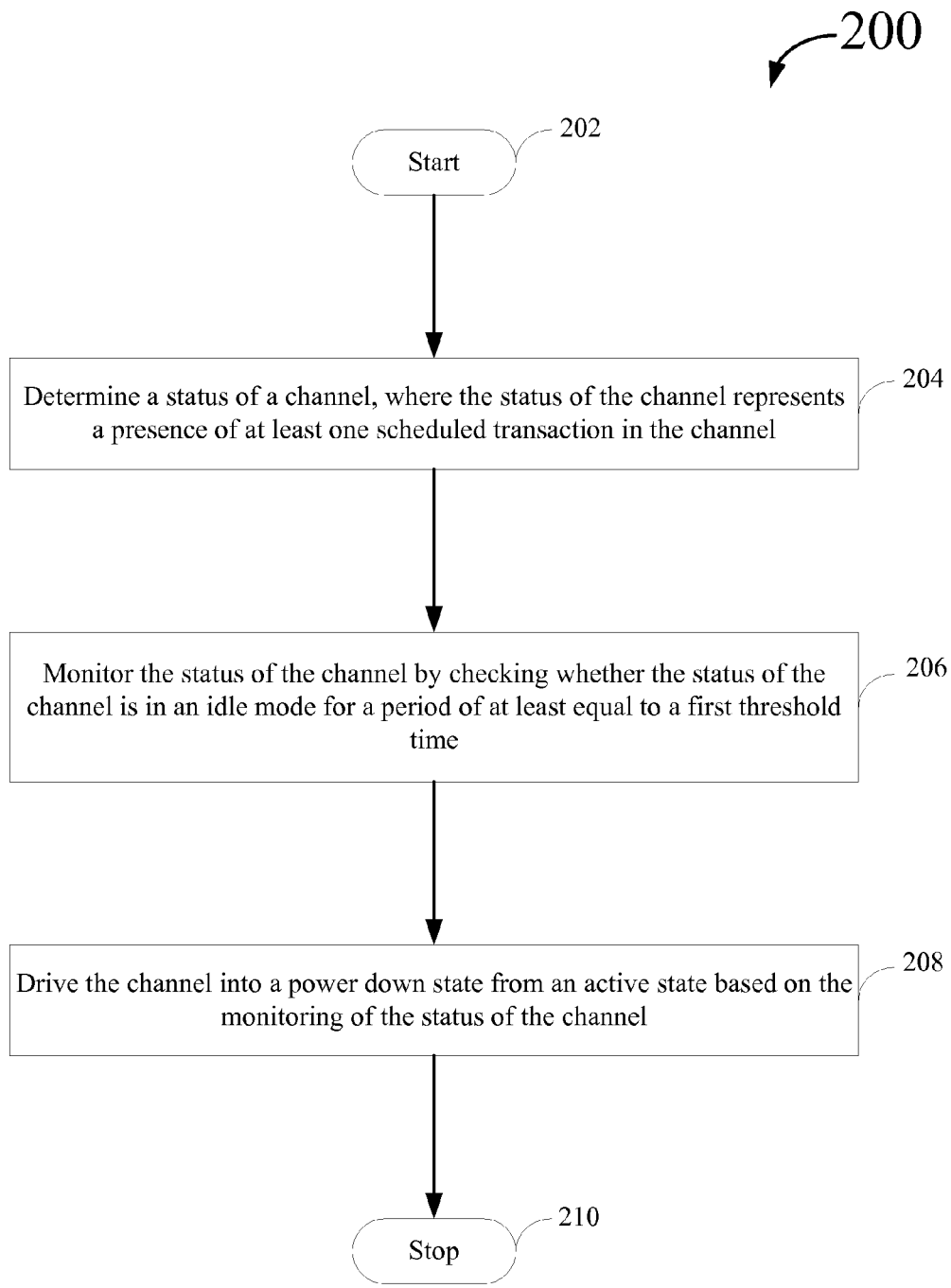
FIG. 2 is a flow diagram representing a method for reducing memory power consumption in the server system, in accordance with an embodiment of the present disclosure.

The method for reducing the memory power consumption in a server system, such as the server system 100 is shown in FIG. 2. FIG. 2 is a flow diagram illustrating a method 200 for reducing the memory power consumption in the server system 100, in accordance with an embodiment of the present disclosure. Accordingly, for the purpose of description of FIG. 2, references will be made to FIG. 1, as described above.

At 202, the method 200 for reducing the memory power consumption in the server system 100 starts. As described in conjunction with FIG. 1, a memory controller such as the memory read controller 102 of the server system 100 has separate queues for the even ranks $105_e$ and the odd ranks $105_o$ of a channel of the memory read controller 102. The channel of the memory read controller 102 may be used for the transactions between the memory read controller 102 and at least one DIMM of the DIMMs 112. For the purposes of this description, it is assumed that the method 200 starts with the channel being in an active state.

At 204, the method 200 determines a status of the channel of the memory read controller 102. The status of the channel represents a presence of at least one scheduled transaction in the channel. The at least one scheduled transaction may be present in a queue of the channel. The transactions in the channel are typically scheduled by the memory read controller 102. The present disclosure is directed to utilize a time duration for which there is no scheduled transaction in the channel, i.e., when the channel is in an idle mode.

At 206, the method 200 monitors the status of the channel of the plurality of channels of the memory read controller 102. Specifically, the status of the channel may be represented by a flag bit, for example, a logic bit '1' may represent that at least one transaction is in waiting in the channel. Similarly, a logic bit '0' may represent that there is no transaction in the channel for a specific duration. The specific duration may be chosen based on specific performance requirements of individual applications in the server system 100.

At 208, the method includes driving the channel into a power down state based on the act of the monitoring of the status of the channel performed at 206. The monitoring of the channel involves checking a condition whether the status of the channel is in the idle mode for a period at least equal to a first threshold time. Herein, the idle mode of the channel may be defined as a state where there are no scheduled transactions in the channel for the specific duration and/or the channel is free. Thereafter, the method 200 terminates at 210.

In this embodiment, driving the channel into the power down state comprises driving the channel and at least one DIMM associated with the channel into a self refresh mode. In one example, the self refresh mode of the channel occurs when a CKE (clock enable) signal is pulled low for all the ranks (105$_o$ and 105$_e$) of the channel. Further, the self refresh mode may occur when the clock does not toggle for the at least one DIMM associated with the channel, and there are no periodic refreshes from the memory read controller 102. These operations may significantly reduce memory power consumption.

Figure 3:
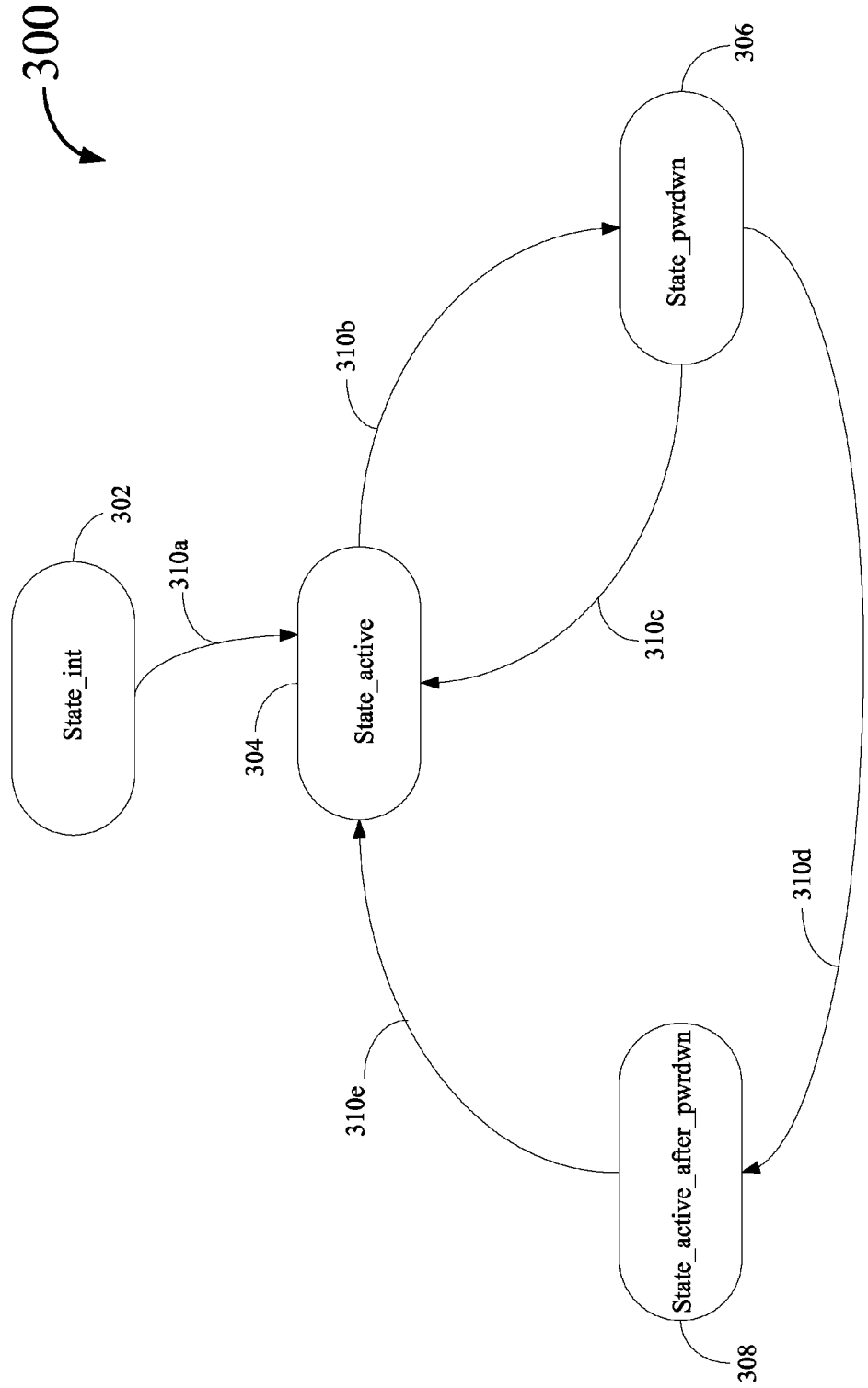
FIG. 3 illustrates a state transition diagram of a method for reducing the memory power consumption in the server system, in accordance with another embodiment of the present disclosure.

In another embodiment of the present disclosure, a method for reducing the memory power consumption in a server system, such as the server system 100, may be described by referring to FIG. 3. FIG. 3 illustrates a state transition diagram 300, in accordance with another embodiment of the present disclosure. Herein, for the purpose of this description, various transitions between multiple states of the state transition diagram 300 will be used to describe the method for reducing the memory power consumption in the server system 100, according to this embodiment of the present disclosure.

Without departing from the scope of the present disclosure, it is assumed that the state transition diagram 300 initiates from a state_init 302. Specifically, the state_init 302 represents a subsequent state of the channel after the channel is initialized from a reset state. From the state_init 302, the channel is brought into an active state (represented and hereinafter referred to by a state_active 304 in the state transition diagram 300) by the memory read controller 102, which is shown by a transition 310a. In the state_active 304, the memory read controller 102 is in an active mode and may handle transactions to the at least one DIMM through the channel. Accordingly, the channel is also occupied and is in active mode.

During the period when the channel is in the state_active 304, a time duration is measured for which the channel remains in the idle mode in a continuous manner. It will be apparent to a person skilled in the art that the time duration of the channel may be measured by any suitable electronic circuitries, such as counters. In one embodiment of the present disclosure, a counter may be used for the measurement of the time duration for which the channel remains in the idle mode. The counter (hereinafter referred to as a 'counter_idle') resets every time at least one transaction is detected in a queue of the channel, which implies that the channel is not in the idle mode. In case there is no transaction in the queue of the channel, the counter_idle may increment with every clock cycle. When the counter_idle reaches at a first threshold time (hereinafter referred to as an 'idle_threshold time'), the state of the channel transitions to a power down state of the state transition diagram 300.

The power down state is represented by a state_pwrdwn 306 in the state transition diagram 300 and is accordingly hereinafter also referred to as 'the state_pwrdwn 306'. The transitioning from the state_active 304 to the state_pwrdwn 306 is represented by a transition 310b. As already described, the transition 310b is performed based on a condition whether the status of the channel is in the idle mode for a period of at least equal to the idle_threshold time. In the state_pwrdwn 306, the memory read controller 102 goes into a power savings mode, and the at least one DIMM associated with the channel is placed into the self refresh mode.

While the channel is in the state_pwrdwn 306, a period is measured for which the channel remains in the state_pwrdwn 306. This period may also be measured by any suitable electronic mechanism such as a counter (hereinafter referred to as a counter_pwrdwn). More specifically, in one embodiment of the present disclosure, with every clock cycle, the counter_pwrdwn may be incremented to measure the period. When the period measured by the counter_pwrdwn is at least equal to a second threshold time (hereinafter referred to as a 'pwrdwn_threshold time'), the channel is driven into an active after power down state. The active after power down state is represented by a state_active_after_pwrdwn 308 in the state transition diagram 300 and is accordingly hereinafter also referred to as 'the state_active_after_pwrdwn 308.'

However, while the channel is in the state_pwrdwn 306, the channel transitions to the state_active 304 in case the status of the channel includes the presence of at least one transaction. More specifically, when a transaction is detected in the channel, the channel is driven into the state_active 304 from the state_pwrdwn 306, which is represented by a transition 310c in the state transition diagram 300. In an embodiment of the present disclosure, the difference between the counter_pwrdwn and the pwrdwn_threshold time is calculated. When the difference between the counter_pwrdwn and the pwrdwn_threshold time is greater than a third threshold time (hereinafter referred to as a 'threshold_4_change time'), the pwrdwn_threshold time is decremented by the threshold_4_change time.

The transition of the channel from the state_pwrdwn 306 to the state_active_after_pwrdwn 308 is represented by a transition 310d in the state transition diagram 300. As already described, the transition 310d is performed based on a condition whether the channel remains in the state_pwrdwn 306 for a period of at least equal to the pwrdwn_threshold time. In the state_active_after_pwrdwn 308, the memory read controller 102 comes out of the self refresh mode into the active mode for the channel. However, in this state, no transaction is detected in the queue of the channel from the time of the memory read controller 102 coming into the active mode. When the channel is in the state_active_after_pwrdwn 308, the counter_idle may increment with every clock cycle.

While the channel is in the state_active_after_pwrdwn 308, the channel is driven into the state_active 304, in case at least one transaction is detected in the queue of the channel. Further, when there is no transaction detected in the queue of the channel and the counter_idle increments to at least equal to the threshold_4_change time the channel is driven into the state_active 304. This is shown by a transaction 310e in the state transition diagram 300.

The values of the different periods, such as the idle_threshold time, the pwrdwn_threshold time and the threshold_4_change time may be chosen to meet the specific performance requirements of the individual applications. In an embodiment of the present disclosure, the counters such as the counter_idle and the counter_pwrdwn may be designed based on different load utilization levels in the server system 100. For example, a high value for the idle_threshold time may be suitable to cater high load conditions in the server system 100, so that the performance of the transactions is not impacted between the memory read controller 102 and the DIMMs 112. Further, such a high value of the idle_threshold time may reduce the frequent transitions from the state_active 304 to the state_pwrdwn 306. Similarly, in another embodiment, the present disclosure may utilize a low value of the idle_threshold time for low load conditions in the server system 100. Without departing from the scope of the present disclosure, the method 200 and the method described in conjunction with the state transition diagram 300 may be performed by a system 400 as illustrated in FIG. 4.

Figure 4:
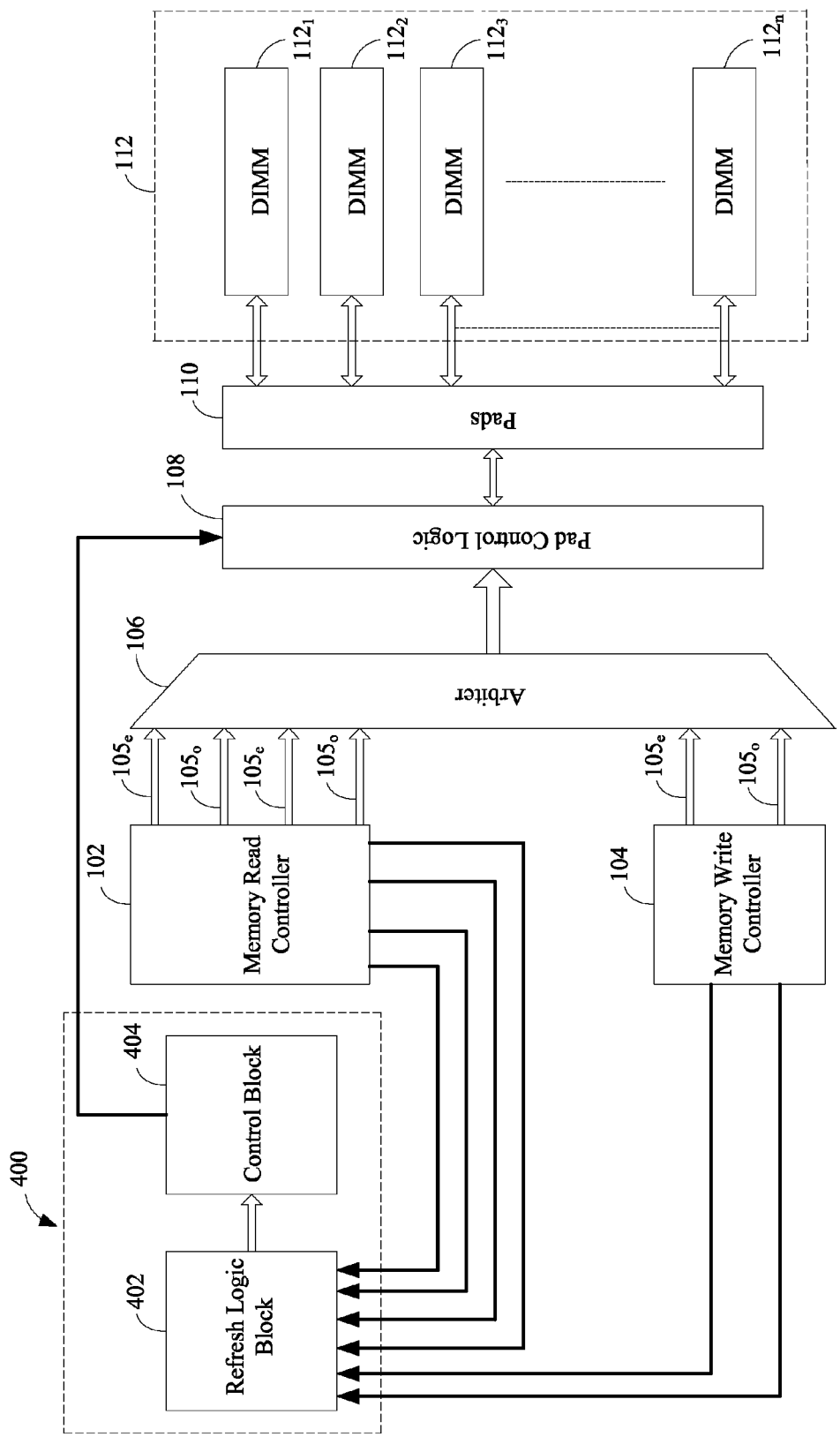
FIG. 4 is a schematic block diagram illustrating a system for reducing the memory power consumption in the server system.

FIG. 4 is a schematic block diagram illustrating a system 400 for reducing memory power consumption in the server system 100 of FIG. 1, in accordance with an embodiment of the present disclosure. For the purpose of description of FIG. 4, reference will be made to FIGS. 1, 2 and 3 described above. The system 400 includes a refresh logic circuitry 402 and control circuitry 404. As used in any embodiment herein, "circuitry" may comprise, for example, singly or in any combination, hardwired circuitry, programmable circuitry, state machine circuitry, and/or firmware that stores instructions executed by programmable circuitry. Refresh logic circuitry 402 may be coupled to memory controllers, such as the memory read controller 102 and the memory write controller 104.

In the server system 100, the memory read controller 102 has the plurality of channels associated with the DIMMs 112. As already described in conjunction with FIG. 1, each of the channel may have separate queues. Further, in the each queue, a particular channel may have a status output indicating whether there is any scheduled transaction in a particular rank of the queue. The refresh logic circuitry 402 may be configured to receive the status outputs from each of the queues of a channel. The received status outputs are a status of the channel. The refresh logic circuitry 402 monitors the status of the channel, which is associated with at least one DIMM of the DIMMs 112. Specifically, the refresh logic circuitry 402 may monitor the status of each of the plurality of channels associated with the DIMMs 112.

Based on monitoring of the status of the channel, the refresh logic circuitry 402 may discover the presence of any scheduled transactions in the channel. Further, the refresh logic circuitry 402 may be configured to determine a state of a plurality of states for the channel based on the monitoring of the status of the channel and at least one predefined condition. The control circuitry 404 may be coupled to the refresh logic circuitry 402 and configured to receive the determined state from the refresh logic circuitry 402. Further, the control circuitry 404 may be configured to drive the channel into the determined state, of the plurality of states, in order to reduce the memory power consumption in the server system 100. Specifically, the control circuitry 404 may be connected to the pad control logic 108, which drives the channel and at least one DIMM associated with the channel into the determined state.

In an embodiment of the present disclosure, the plurality of states may include an active state, a power down state and an active after power down state. The refresh logic circuitry 402 may include a state machine (not shown) to determine the state of the channel from the plurality of states. The state is determined such that the channel may be driven into the determined state to enable the system 400 to reduce the memory power consumption without affecting the performance of the server system 100. The state machine may transition from a present state to a next state, which may be referred from the description of the state transition diagram 300, in conjunction with FIG. 3. In FIG. 3, the active state, the power down state and the active after power down state are represented as the state_active 304, the state_pwrdwn 306 and the state_active_after_pwrdwn 308, respectively.

In an embodiment of the present disclosure, the state machine includes the counter_idle (first counter), the counter_pwrdwn (second counter) and a state machine circuitry. The counter_idle is capable of determining a time duration for which the channel remains in the idle mode. The counter_pwrdwn is capable of determining a time duration for which the channel remains in the state_pwrdwn 306. The state machine circuitry is configured to determine the next state from the present state of the channel, which may be any of the state_active 304, the state_pwrdwn 306 and the state_active_after_pwrdwn 308 in order to facilitate the control circuitry 404 to drive the channel in the next state.

As already described in conjunction with FIG. 3, the state machine circuitry determines the next state as the state_pwrdwn 306 from the state_active 304 for the channel when a count of the counter_idle is at least equal to the idle_threshold time (first threshold time). More specifically, the state machine determines the state_pwrdwn 306 as the next state, when the status of the channel does not include the presence of any scheduled transaction, i.e., the status remains in the idle mode for a duration of the idle_threshold time. Further, the next state, which is the state_pwrdwn 306, is provided to the control block 404, which drives the channel into the state_pwrdwn 306 from a present state of the channel, which is the state_active 304.

Further, the state machine circuitry determines the next state as the state_active_after_pwrdwn 308 from the state_pwrdwn 306 for the channel when a count of the counter_pwrdwn is at least equal to the pwrdwn_threshold time. More specifically, the state machine circuitry determines the state_active_after_pwrdwn 308 as the next state, when the state of the channel remains in the state_pwrdwn 306 for a period of at least equal to the pwrdwn_threshold time. Further, the next state, which is the state_active_after_pwrdwn 308, is provided to the control block 404, which drives the channel into the state_active_after_pwrdwn 308 from a present state of the channel, which is the state_pwrdwn 306. However, while the channel is in the state_pwrdwn 306, the state machine circuitry is configured to determine the state_active 304 as the next state, in case at least one transaction is detected in the queue of the channel.

The state machine circuitry is further configured to determine the state_active 304 as the next state from the state_active_after_pwrdwn 308, when the at least one transaction is detected in the queue of the channel. Furthermore, the state machine circuitry is configured to determine the state_active 304 as the next state from the state_active_after_pwrdwn 308, when the counter_idle after increments reaches to at least equal to the threshold_4_change time.

In an embodiment of the present disclosure the, the refresh logic circuitry 402 further comprises a plurality of storage blocks (not shown) for storing the idle_threshold time, the pwrdwn_threshold time and the threshold_4_change time. More specifically, the plurality of storage blocks may be three registers for storing the idle_threshold time, the pwrdwn_threshold time and the threshold_4_change time, respectively. In an embodiment of the present disclosure, each of three registers may be designed as 48 bits wide. Accordingly, each of the counter_idle and the counter_pwrdwn may be designed as 48 bits wide. Values of different thresholds (the pwrdwn_threshold time, the threshold_4_change time and the idle_threshold time) may be selected in order to meet specific performance requirements of the individual applications. For example, a high value for the idle_threshold time may be selected during high load conditions in the server system 100, so that performance is not impacted. Similarly a low value for the idle_threshold time may be selected for low load conditions in the server system 100. Herein, the load conditions relate to a memory bandwidth for the transactions between the memory read controller 102 and the DIMMs 112, as observed by the system 400.

Further, components of the system 400, such as the refresh logic circuitry 402 and the control circuitry 404 may be implemented as hardware modules, software modules, firmware modules, or any combination thereof. Furthermore, it will be obvious to those skilled in the art that the system 400 may include requisite electrical connections for communicably coupling the components of the system 400.

The present disclosure, as implemented by methods, such as the method 200 and the method described in conjunction with the state transition diagram 300, and a system, such as the system 400, may be advantageous for the reduction in the memory power consumption in a server system, such as the server system 100. The system and the method may be implemented in server systems such as the blade servers, the rackmount and pedestal servers and the workstations. The present disclosure may also save significant power in the low load conditions in the server system 100.

In experimental data, with the application of the system and use of the methods described in the present disclosure, a savings of 10 watts is observed for a 32 GB system with regular work load for the rackmount server. In a typical server, there are idle cycles during the executions and sometimes the idle cycles may be significant between the executions. These idle cycles has been used by the present disclosure to reduce the memory power consumption. Further, the present disclosure utilizes a channel based refresh to achieve the reduction in the memory power consumption.

As described above, the embodiments of the disclosure may be embodied in the form of a computer program product for reducing memory power consumption in a server system, such as the server system 100. Embodiments of the disclosure may also be embodied in the form of program module containing instructions embodied in tangible media, such as floppy diskettes, CD-ROMs, hard drives, or any other computer-readable storage medium, wherein, when the program module is loaded into and executed by a computer, the computer becomes an apparatus for practicing the disclosure. The present disclosure may also be embodied in the form of computer program code, for example, whether stored in a storage medium, loaded into and/or executed by a computer, or transmitted over some transmission medium, such as over electrical wiring or cabling, through fiber optics, or via electromagnetic radiation, wherein, when the computer program code is loaded into and executed by a computer, the computer becomes an apparatus for practicing the disclosure. When implemented on a general-purpose microprocessor, the computer program code segments configure the microprocessor to create specific logic circuits.

The foregoing descriptions of specific embodiments of the present disclosure have been presented for purposes of illustration and description. They are not intended to be exhaustive or to limit the present disclosure to the precise forms disclosed, and obviously many modifications and variations are possible in light of the above teaching. The embodiments were chosen and described in order to best explain the principles of the present disclosure and its practical application, to thereby enable others skilled in the art to best utilize the present disclosure and various embodiments with various modifications as are suited to the particular use contemplated. It is understood that various omissions and substitutions of equivalents are contemplated as circumstance may suggest or render expedient, but such are intended to cover the application or implementation without departing from the spirit or scope of the claims of the present disclosure.

What is claimed is:

1. A method for reducing memory power consumption in a server system, the server system comprising a memory controller and a plurality of Dual Inline Memory Modules (DIMMs), the method comprising:
   determining a status of a channel of a plurality of channels of the memory controller, the plurality of channels associated with the plurality of DIMMs of the server system, the status of the channel representing presence of at least one scheduled transaction in the channel;
   monitoring the status of the channel, wherein the monitoring the status of the channel comprises checking whether the status of the channel is in an idle mode for a period of at least equal to a first threshold time;
   driving the channel of the plurality of channels into a power down state from an active state based on the monitoring of the status of the channel; and further comprising one of
   driving the channel into an active after power down state from the power down state based on a condition whether the channel is in the power down state for a period of at least equal to a second threshold time; and
   driving the channel into the active state from the power down state based on a condition whether the status of the channel comprises the presence of at least one scheduled transaction in the channel.

2. The method of claim 1, further comprising driving the channel into the active state from the active after power down state based on a condition whether the status of the channel comprises the presence of at least one scheduled transaction in the channel and whether the channel is in the active after power down state for a period of at least equal to a third threshold time.

3. An apparatus for reducing memory power consumption in a server system, the server system comprising a memory controller and a plurality of Dual Inline Memory Modules (DIMMs), the apparatus comprising:
   a refresh logic block configured to
      monitor a status of each channel of a plurality of channels, the plurality of channels associated with the plurality of DIMMS, the status representing a presence of at least one scheduled transaction in the each channel of the plurality of channels, and
      determine a state of a plurality of states for the each channel based on the monitoring of the status of the each channel and at least one predefined condition;

a control block for driving the channel into the determined state to reduce the memory power consumption in the server system;

wherein the refresh logic block comprises a state machine configured to determine the state of the plurality of states based on the status of the channel and the at least one predefined condition; and wherein the state machine comprises a first counter capable of determining a time duration for which the state of the channel is in an idle mode;

a second counter capable of determining a time duration for which the state of the channel is in a power down state; and a state machine circuitry configured to determine a next state as the power down state from an active state for the channel when a count of the first counter is at least equal to a first threshold time, determine a next state as an active after power down state from the power down state for the channel when a count of the second counter is at least equal to a second threshold time, determine a next state as the active state from each of the power down state and the active after power down state when the status of the channel comprises the presence of at least one scheduled transaction, and determine a next state as the active state from the active after power down state when the count of the first counter is at least equal to a third threshold time.

4. The apparatus of claim 3, wherein the plurality of states comprises an active state, a power down state and an active after power down state.

5. The apparatus of claim 3, wherein the refresh logic block further comprises a plurality of storage blocks, the plurality of storage blocks configured to store the first threshold time, the second threshold time and the third threshold time.

6. A computer program product embodied on a computer readable storage medium for reducing memory power consumption in a server system, the server system comprising a memory controller and a plurality of Dual Inline Memory Modules (DIMMs), the computer program product comprising a program module having instructions for:

determining a status of a channel of a plurality of channels of the memory controller, the plurality of channels associated with the plurality of DIMMs of the server system, the status of the channel representing a presence of at least one scheduled transaction in the channel;

monitoring the status of the channel, wherein the monitoring the status of the channel includes checking whether the status of the channel is in an idle mode for a period at least equal to a first threshold time;

driving the channel of the plurality of channels into a power down state from an active state based on the monitoring of the status of the channel; and wherein the program module further comprises instruction for performing one of driving the channel into an active after power down state from the power down state based on a condition whether the channel is in the power down state for a period of at least equal to a second threshold time; and driving the channel into the active state from the power down state based on a condition whether the status of the channel comprises the presence of at least one scheduled transaction in the channel.

7. The computer program product of claim 6, wherein the program module further comprises instruction for driving the channel into the active state from the active after power down state based on a condition whether the status of the channel comprises the presence of at least one scheduled transaction in the channel and whether the channel is in the active after power down state for a period of at least equal to a third threshold time.

* * * * *